C. L. HOFF.
ELECTRIC CHAIN LINK WELDING APPARATUS.
APPLICATION FILED DEC. 5, 1907.

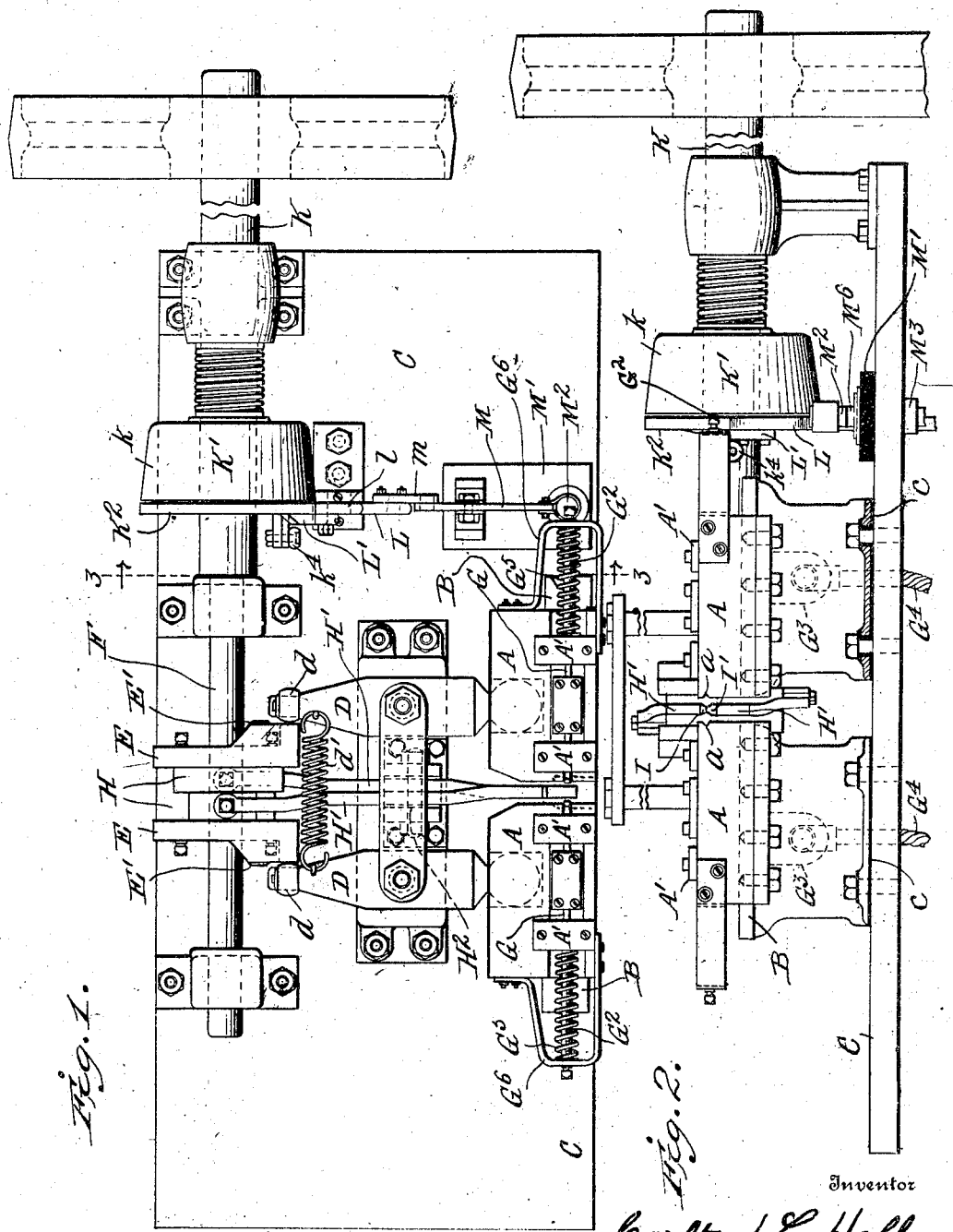

943,190.

Patented Dec. 14, 1909.
3 SHEETS—SHEET 2.

Witnesses
E. C. Alexander
Thomas Durant

Inventor
Carlton L. Hoff,
By Church & Church
his Attorney

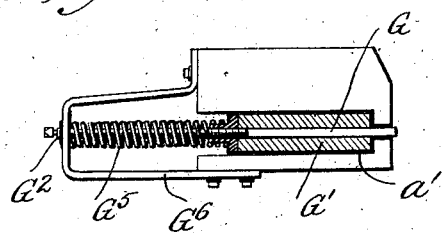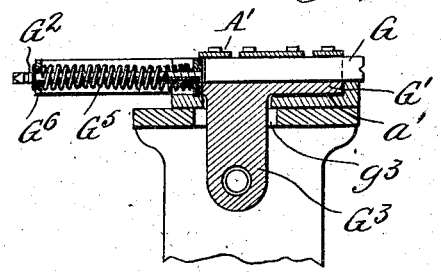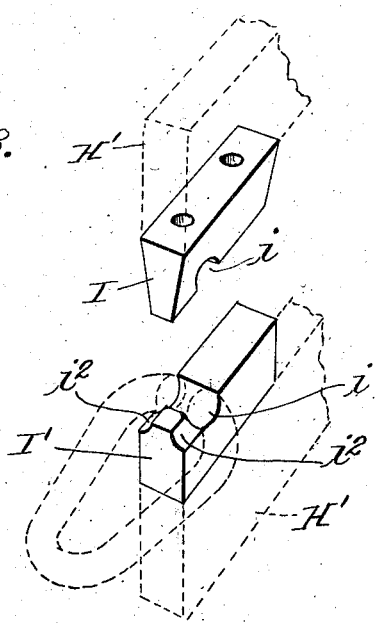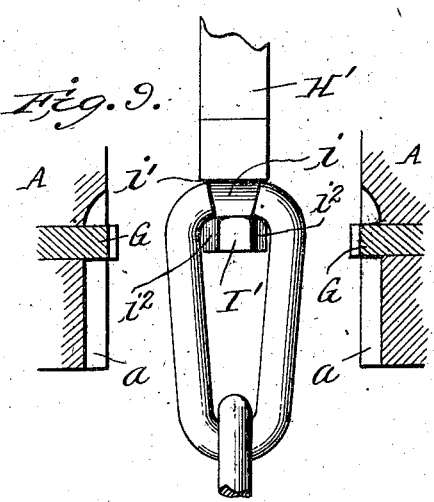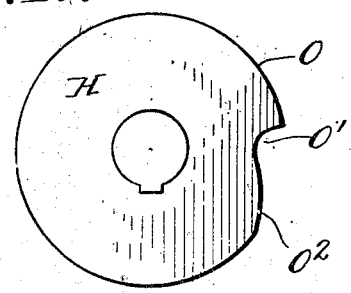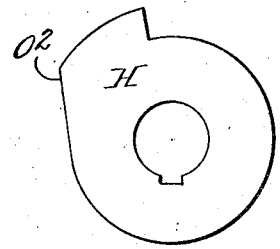

UNITED STATES PATENT OFFICE.

CARLTON L. HOFF, OF YORK, PENNSYLVANIA, ASSIGNOR TO STANDARD CHAIN COMPANY, OF YORK, PENNSYLVANIA, A CORPORATION OF NEW JERSEY.

ELECTRIC CHAIN-LINK-WELDING APPARATUS.

943,190.  Specification of Letters Patent.  Patented Dec. 14, 1909.

Application filed December 5, 1907. Serial No. 405,245.

*To all whom it may concern:*

Be it known that I, CARLTON L. HOFF, of York, in the county of York and State of Pennsylvania, have invented a certain new and useful Improvement in Electric Chain-Link-Welding Apparatus; and I do hereby declare the following to be a full, clear, and exact description of the same, reference being had to the accompanying drawings, forming a part of this specification, and to the figures and letters of reference marked thereon.

This invention relates to electric welding and more especially to that particular branch of the art having for its object the production of welded chain or chain links.

The machine of the present invention is not automatic in its operation, but on the contrary each link or article to be welded is presented by the attendant in proper position to be welded, the time during which the current is permitted to flow through the article and the starting and stopping of the mechanism all being controlled or operated by a hand or foot lever or its equivalent.

Figure 3:
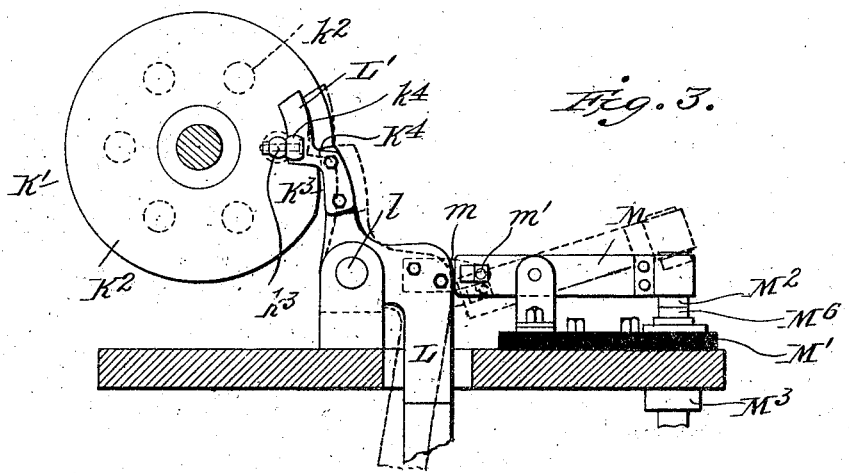
Figure 4:
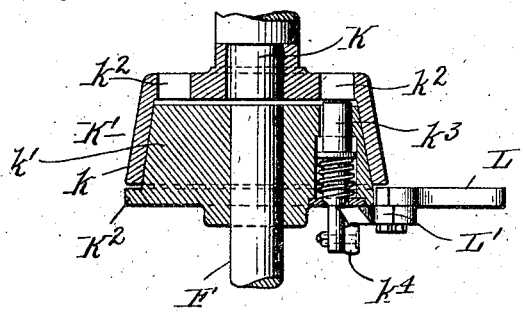
Figure 5:
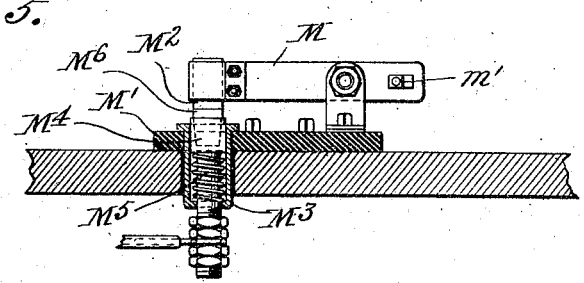

In the accompanying drawings:—Figure 1 is a top plan view of a machine embodying the present improvements. Fig. 2 is a front elevation of the same. Fig. 3 is an elevation of the clutch, control lever and switch looking in the direction of the arrows on the line 3—3, Fig. 1. Fig. 4 is a detail section of the clutch. Fig. 5 is a detail section of the switch. Fig. 6 is a top plan of one of the jaws with the cover plates removed and the electrode and connected parts in section. Fig. 7 is a longitudinal vertical section of the same. Fig. 8 is a perspective view showing the conformation of the faces of the dies for giving form to the weld. Fig. 9 is a view showing the relative position of the lower die and a link when first presented by the attendant. Figs. 10 and 11 are elevations of the cams for operating the dies.

Like characters of reference in the several figures indicate the same parts.

The machine as illustrated, embodies two forming and welding jaws A, A, movable toward and from each other, preferably in a right line, said jaws being guided on ways B supported by any suitable framing, such, for instance, as the flat top C of a machine base framing. Suitable sheet insulation may be introduced between the proximate surfaces of any of the parts which are secured together, as indicated at $c$, for instance, between the ways and base, for preventing circuiting through the framing from one jaw to the other, although such insulation is not ordinarily essential to the successful operation of the machine.

The jaws are moved toward and from each other by levers D, pivotally supported on the base intermediate their length and coöperating at their rear ends with face cams E on a shaft F. The levers D preferably have anti-friction rollers $d$ bearing against the cams and a spring $d'$ serves to hold the rollers against the cams with the jaws separated.

Recesses $a$ are provided in the proximate faces of the jaws of such shape as to engage the sides of a link when the latter is presented to them by the attendant and as the jaws move toward each other to close and press the end faces of the link together at the same time giving proper form to the end of the link. These recesses, it will be noted, extend in a substantially horizontal direction from the front edge partially across the proximate faces of the jaws, thus while one end of the link is grasped by the jaws as they come together, the opposite end projects at the front of the jaws in convenient position to be grasped by the attendant.

While the welding current might reach the link through the jaws themselves, electrodes mounted in but movable with the jaws are preferably provided. The electrodes are indicated by the letter G each electrode being held in a trough or carrier $G'$, having a screw $G^2$ by which the projection of the end of the electrode may be regulated so as to make firm contact with the sides of the link adjacent the end where the weld is to be formed. The trough or electrode carriers are mounted to slide in the jaws, parallel with the line of movement of the jaws and hence they may be conveniently mounted in recesses in the jaws and held therein by cover plates $A'$, suitable sheet insulation $a'$ being placed around the troughs or carriers, circuit connections from the transformer being formed by cables $G^4$ attached to the depending lugs $G^3$ of the troughs. Said lugs $G^3$ may conveniently project down through openings $g^3$ in the jaws and ways, respectively, as shown in Figs. 2 and 7.

For holding the carriers and their electrodes in their advanced position, springs G⁵ are introduced at their rear ends within yokes G⁶. Where desired said springs may perform an important function in the welding operation as will be hereinafter pointed out.

Mounted on the shaft F, preferably between the cams E is a pair of cams H and coöperating with the cams H is a pair of die carriers H' pivotally mounted on the base at H² and projecting between the jaws at their forward ends. The dies I I' are mounted on the carriers in position to clamp or surround the weld at the end of the link, suitable transverse recesses $i$ being formed in the meeting faces of the dies (see Figs. 8 and 9) to give form to the weld.

In addition to giving form to the weld, the lower die I' is designed to serve as a guide in positioning the link to be closed and welded and for this purpose the rear wall $i'$ of the recess is made of greater width than the front wall and preferably wider than the space between the ends of the link when the latter is placed in position, whereby the ends of said rear wall will serve as a stop against which the ends of the link may abut as shown in Fig. 9. The sides of this lower die are also cut away forwardly of the recess to form grooves $i^2$ in which the sides of the link adjacent the weld may rest and along which the open ends of the link may slide in reaching the position for being closed by the jaws and welded.

Motion is imparted to the shaft F from a drive shaft K, the connection between the two shafts being made by a clutch K' under the direct control of the attendant. The detail construction of the clutch is shown in Figs. 3 and 4 wherein it will be seen that cup and cone sections $k$ and $k'$ are mounted on the abutting ends of the shaft, the base of the cup being provided with a series of apertures or sockets $k^2$ while the cam carries a spring pressed pin $k^3$ adapted to coöperate with the sockets when the two shafts are to turn in unison. The outer end of the pin is provided with a head or roller $k^4$ at one side, adapted to ride up on an incline or wedging retractor L' on the end of the control lever L. Control lever L is pivoted on the base at $l$ and is adapted to be operated by the hand or foot of the attendant to withdraw the clutch pin retractor so as to permit the pin to engage the rotating part of the clutch. The end or nose of the control lever preferably rides on the periphery or cam flange K² of the cone but may drop or be moved into a recess K³ when the clutch is to be released, the abrupt or radial side K⁴ of the recess also forming with the end of the lever stops for insuring the arrest of the shaft F at the proper point.

The switch controlling the primary current to the transformer is also under the direct control of the attendant and it is conveniently operated through the medium of the control lever for which purpose the lever L is provided with an arm or projection $m$ having a pin and slot connection $m'$ or equivalent connection with the rear end of a switch lever or arm M pivotally mounted on an insulating base M' and carrying at its forward end a contact piece M² of refractory material, such as carbon. An insulating or insulated cup M³ is mounted in the base and has within it a contact carrier M⁴ adapted to be held up by a spring M⁵. A contact piece M⁶ similar to the contact piece M² is mounted in the carrier. The current is established or broken between the contact pieces M² and M⁶ when the control lever is moved in one direction or the other and as the machine is designed to heat the metal when the shaft F is at rest the contacts are in engagement when the control lever is in position to release the clutch and hold the shaft stationary.

The machine is primarily designed for forming chain from separate open links, one link at a time being taken by the attendant, passed into the end link of those previously welded and presented to the machine for being itself closed and welded. In preparing to operate the machine, therefore, an adequate supply of links is provided, each with the ends to be welded separated from each other a distance great enough to admit previously welded links. The length of the links is quite immaterial as links of any desired length may be welded with equal facility owing to the fact that the welding apparatus only engages one end.

When a link is to be presented the lower die I' is held in proper position by the cam face at O to form a guide in which the end of the link may be rested as shown in Fig. 9; the jaws then advance, grip and close the link, the lower die drops away through the action of the cam face at O' and the machine comes to rest with the control lever in the recess K³. When the control lever moves into the recess K³ the primary circuit is established and the welding current flows from the electrodes across the end of the link to be welded. The attendant watching the heating notes when the welding temperature has been reached and immediately moves the control lever to open the switch and release the clutch pin, thereby cutting off the welding current and permitting the shaft F to begin its rotation.

The electrodes being spring pressed will follow up any advance of the ends of the link toward each other due to the softening of the metal and if the springs are heavy enough may exert all the pressure necessary to effect the welding, but in any event it is preferred that the jaws should also be advanced slightly a definite distance, both to insure a welding pressure and to insure a proper dimensioning of the link for which purpose the cams E are provided with low elevations (E', Fig. 1) over which the levers D ride during the initial movement of the shaft. Just before, during or just after the jaws make this final advance movement, the dies I I' are closed (by the cam surfaces O²) on or around the weld to give it form, after which the jaws and dies open and the lower die is held in position to act as a guide for the next link. The shaft continues its movement and the dwell of the jaws and die sections in the position last described is just long enough to permit the attendant to remove the welded link and insert a new one to be welded. Should the attendant for any reason fail to place a new link in position the lever is held with the nose retracted and the machine makes an idle movement with no current switched on at any time. Even should the lever be moved to stop the machine and switch the current on, no harm is done for no link being present, the circuit is open between the jaws and no current flows.

The exact instant when the dies close to give form to the weld may be varied, as above indicated, within somewhat wide limits, without materially affecting the weld either as to its strength or appearance and any fin left as the result of the action of the dies will be in such position as to be rubbed off by the connecting link, in use or in the tumbling drum, or in any event it projects only within the lateral limits of the chain and is therefore not objectionable in the general run of chain.

Having thus described my invention, what I claim as new and desire to secure by Letters Patent, is:—

1. In an electric chain welder the combination with the welding jaws movable toward and from each other, of a guide between the jaws for positioning the link to be grasped by the jaws and means for moving said guide out of engagement with the link during the heating of the latter.

2. In electric chain welding apparatus, the combination with the welding jaws movable toward and from each other, of die sections movable toward and from each other between the welding jaws, for forming the weld, and means for holding one of said sections in position to form a guide for the link to be grasped by the jaws while the latter are separated and for moving the section out of engagement with the link during the heating of the latter.

3. In an electric chain welding apparatus, the combination with the welding jaws movable toward and from each other to grasp a link and apply the heating current, of die sections movable toward and from each other between the jaws in a plane transverse to the movement of the latter; means for moving said sections to close the die and means for moving one of said sections independently of the movement of the other, whereby one section forms a guide for positioning a new link and is moved out of engagement with the link during the heating of the latter.

4. In an electric chain welding apparatus, the combination with the jaws movable toward and from each other to grasp a link and apply the welding current, of weld forming die sections movable toward and from each other between the jaws, one of said die sections having a projecting portion forming a gage for positioning a link when the jaws are open and a cam for withdrawing said die section when the jaws grasp the link and the welding current is applied.

5. In an electric chain welding apparatus a die section for giving form to the weld, embodying a transverse weld forming groove having one wall of greater width than the other to form stop projections for the ends of the link.

6. In an electric welding apparatus, the combination with the jaws for grasping the link and applying the welding current, a shaft, cams thereon for moving the jaws and a drive shaft, of a clutch between the shafts, a lever controlling said clutch and an electric switch connected with said lever and operated thereby to break the circuit when the lever is moved to render the clutch operative and to establish the circuit when the clutch is disconnected.

7. In an electric welding apparatus the combination with the jaws for grasping the link and applying the welding current, a shaft, cams thereon for moving the jaws and a drive shaft, of a clutch between the shafts, a stop shoulder on one of the clutch sections, a lever controlling the engagement and disengagement of the clutch sections and having a shoulder adapted to engage the shoulder on the clutch section to arrest the movement of the cam shaft, and an electric switch connected with and operated by the lever to establish the welding current when the lever is moved to release the clutch sections and arrest the shaft and to break the circuit when the lever is moved to release the clutch sections.

8. In an electric welding apparatus, the combination with a welding jaw and means for positively advancing the same to close a link, of an electrode support movably mounted in the jaw, an electrode adjustably mounted in the support and a spring coöperating with the support to yieldingly hold the electrode with its end projecting beyond the operative face of the jaw.

9. An electric chain link welding apparatus embodying means for supplying heating currents, welding jaws movable toward and from each other to grasp and close a link between them said jaws having seats for the link formed by recesses in their proximate faces, open at one side throughout their length and extending horizontally to the front faces of the jaws whereby the end of the link may project beyond the jaws in position to be grasped by the attendant.

10. An electric chain link welding apparatus embodying welding jaws having link receiving recesses in their proximate faces open at one side throughout their length, said recesses extending in a substantially horizontal direction from the front edge partially across said faces and of proper shape to give form to the end of the link, means for moving the jaws toward and from each other and means for supplying heating currents to the jaws, whereby one end of a link may be grasped, heated, and welded between the jaws and the other end is left free to be grasped by the attendant.

CARLTON L. HOFF.

Witnesses:
H. V. JENNINGS.
A. J. BRENNEMAN.